Figure 1:
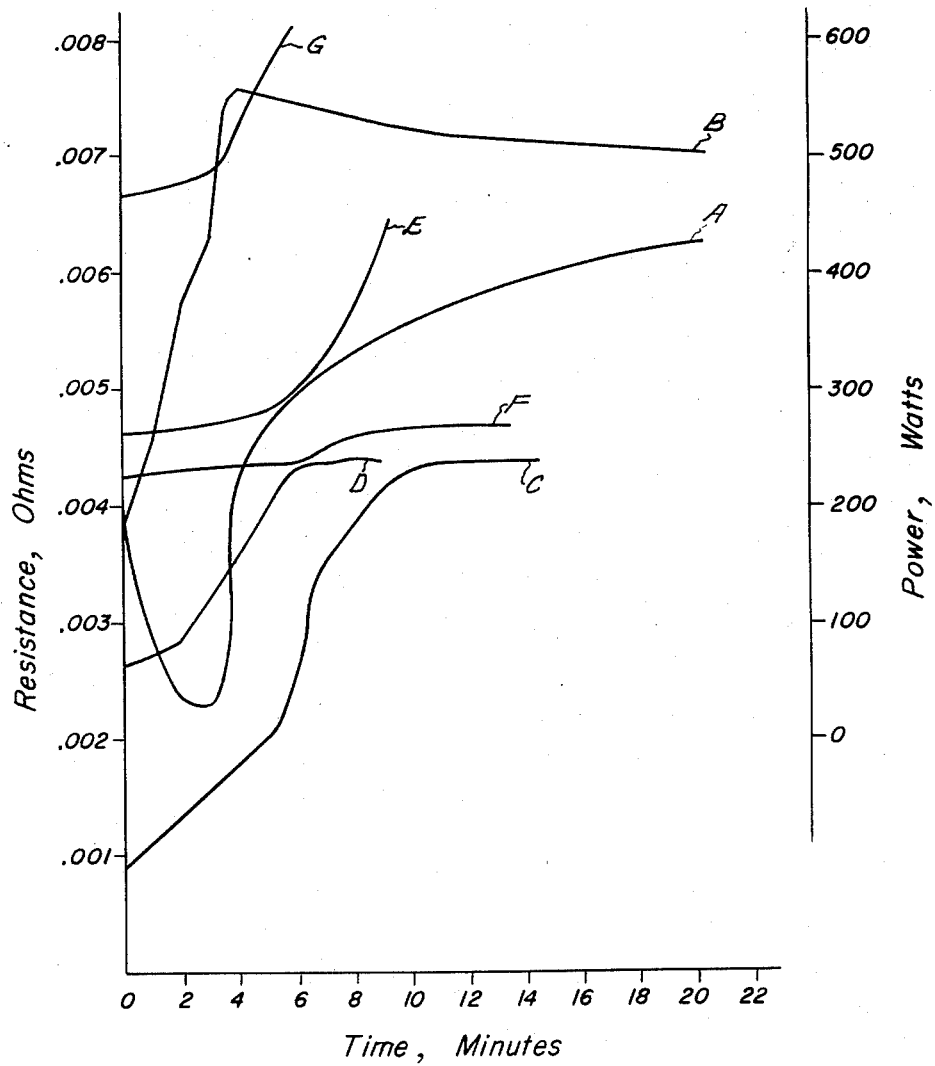

Aug. 2, 1960 H. T. HALL 2,947,608
DIAMOND SYNTHESIS
Filed Aug. 29, 1955 2 Sheets-Sheet 2
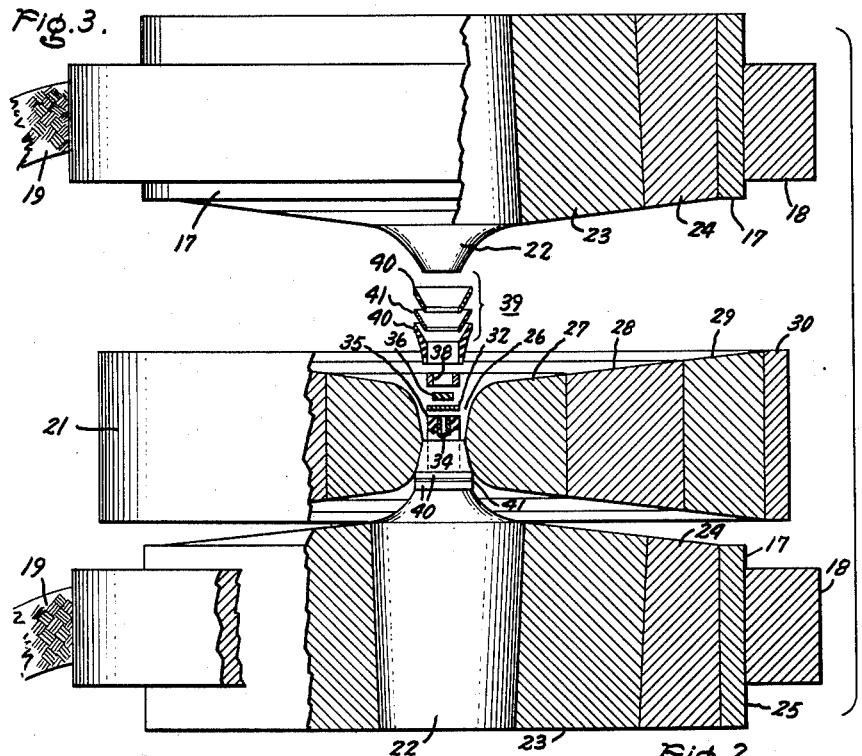
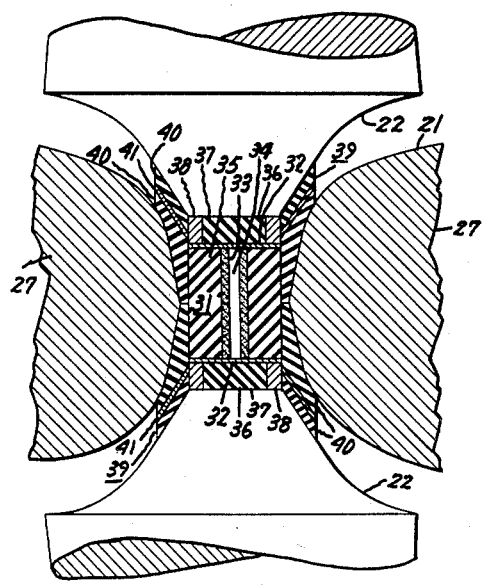
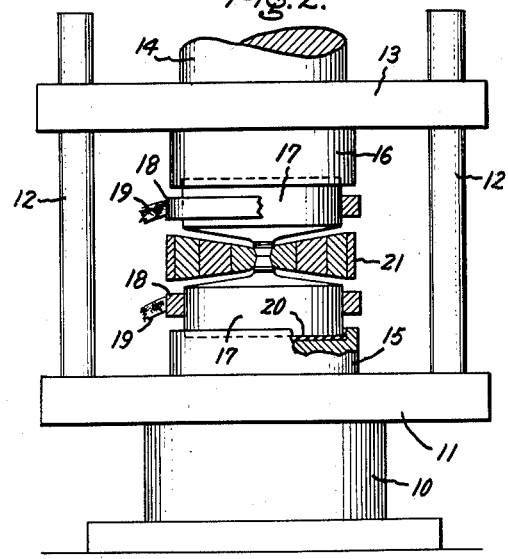
Inventor:
Howard Tracy Hall,
by Paul A. Frank
His Attorney.

United States Patent Office 2,947,608
Patented Aug. 2, 1960

2,947,608

DIAMOND SYNTHESIS

Howard Tracy Hall, Schenectady, N.Y., assignor to General Electric Company, a corporation of New York Filed Aug. 29, 1955, Ser. No. 530,935

10 Claims. (Cl. 23—209.1)

This invention relates to a method for converting non-diamond carbon into diamond and has for its principal object the provision of a method for converting non-diamond carbon into diamond which eliminates the need for determining the temperature at which the conversion takes place and which provides a positive indication of the time at which the conversion takes place.

These and other objects of my invention are accomplished by subjecting a mixture of non-diamond carbon and a suitable catalyst to a pressure of at least 75,000 atmospheres and applying sufficient heat to said mixture for a sufficient length of time to cause an inflection in the electrical resistance of said mixture. Inflection in electrical resistance as used in this application refers to a marked change in the rate of change of electrical resistance.

My invention may be better understood by reference to the following description taken in connection with the accompanying drawings in which Fig. 1 shows the variation with time of the electrical resistance of mixtures of various allotropic forms of carbon when heat is applied to said mixtures; Fig. 2 is a front elevational view of a hydraulic press with a high pressure high temperature apparatus useful in the practice of the present invention; Fig. 3 is an enlarged, exploded sectional view of high temperature high pressure apparatus which is shown in Fig. 2; and Fig. 4 is an enlarged sectional view of the reaction vessel and associated parts which are shown in Figs. 2 and 3.

In the application of H. T. Hall, H. M. Strong and R. H. Wentorf, Serial No. 488,116, filed February 14, 1955, and now abandoned, and assigned to the same assignee as the present invention, there is described a method of converting non-diamond carbon into diamond by subjecting a mixture of non-diamond carbon and a catalyst to a pressure of at least 75,000 atmospheres at a temperature of from 1200 to 2000° C. The catalyst is selected from the class consisting of group VIII metals of the periodic table, chromium, tantalum, manganese and compounds of these metals which decompose to a metallic state under the conditions of the reaction. As described in the aforementioned application, it was believed to be necessary to measure the pressure and temperature of the reaction mixture to determine whether proper diamond-forming conditions had been reached. And as pointed out further in the aforementioned application, the temperature in the reaction mixture could vary over a range of as high as 100 to 200° C. between spaced points in the reaction mixture. Thus, by the process described in the aforementioned application it was necessary to make a direct temperature measurement even though the temperature measurement did not necessarily represent the average temperature in the reaction mixture.

It has now been discovered that the reaction mixture employed in the conversion of non-diamond carbon to diamond has peculiar electrical resistance (hereinafter referred to as "resistance") characteristics which enable the determination of when the conversion has taken place without making any temperature measurement. Specifically, it has been found that when a reaction mixture convertible to diamond at pressures of at least 75,000 atmospheres is heated, the resistance of the reaction mixture decreases, remains substantially constant or increases at a slow rate prior to the conversion. At the same time as the conversion begins, the resistance begins to change rapidly (generally increase) with time and an inflection point is observed on a curve representing the change of resistance with time. Thus, where insufficient heat is applied to the reaction mixture to cause the conversion, the resistance of the reaction mixture does not begin to increase rapidly with time and no inflection point is observed. Where sufficient heat at this high pressure is applied to the reaction mixture to cause the conversion, the resistance of the reaction mixture does not begin to increase rapidly with time (inflection in the resistance) until the conversion begins to take place.

Although I do not wish to be bound by theoretical considerations, it is believed that the materials described as catalysts in this application serve a dual function. Their first function is to act as a catalyst for transforming non-diamond carbon into diamond. Their second function is to act as a relatively good solvent for the non-diamond carbon while at the same time being a relatively poor solvent for diamond. It is also believed that this solvent effect does not come into play until the catalyst is converted to a liquid metal. At pressures of at least 75,000 atmospheres and temperatures of from 1200 to 2000° C. the catalysts are metals in the liquid form. These liquid metals, under the conditions described, are believed to have a much greater solvent effect for non-diamond carbon than for diamonds. Thus, when forming diamonds using graphite as the non-diamond carbon and nickel as the catalyst, it is believed that the graphite dissolves into the molten nickel and because of the catalytic action of the nickel is converted into diamond. Diamond, being relatively insoluble in the nickel, precipitates from the molten nickel allowing more graphite to go into solution to continue the process. It is also believed that a molten metal catalyst under the conditions of the reaction has a higher electrical resistance than the solid catalyst.

These theoretical considerations are believed to explain the resistance effect previously mentioned. Thus, where insufficient heat is applied to the reaction mixture to melt the catalyst, the resistance of the reaction mixture fails to change rapidly with time. Where sufficient heat is applied to the reaction mixture, during the initial time of application of the heat, the reaction mixture is merely approaching the temperature at which melting will take place so that there is no tendency for the resistance of the mixture to change rapidly. As the temperature of the reaction mixture reaches the melting point of the catalyst, the resistance of the reaction mixture begins to change rapidly because of the higher resistance of the molten catalyst as compared to the resistance of the solid catalyst. And at the melting point of the catalyst, the conversion from non-diamond carbon to diamond begins to take place, and an inflection in the electrical resistance occurs.

This resistance effect is illustrated in Fig. 1. Curve A is a plot of the resistance versus time of a graphite-nickel reaction mixture at a pressure of about 95,000 atmospheres. As shown in this curve, the resistance of the reaction mixture began to decrease for the first three minutes that heat was applied and subsequent to this an inflection in the resistance occurred as the resistance began to increase at a rapid rate. Curve B in the drawing represents the power in watts used to heat this particular reaction mixture versus time.

The reactants and the pressure requirements of the present invention are identical to those described in the aforementioned Hall et al. application. Thus, the non-diamond carbon within the scope of the present invention include all of the commonly available types of carbon such as coal, coke, charcoal, or graphite, etc. The catalysts employed in the practice of the present invention include those metals mentioned previously as well as compounds of these metals such as, for example, carbides, sulfides, carbonyls, cyanides, ferrotungstates, ferritungstates, oxides, nitrides, nitrates, hydrides, chlorides, molybdates, arsenates, acetates, oxalates, carbonates, chromates, phosphides, permanganates, sulfates, tungstates, etc. Specific examples of decomposable compounds usable as catalysts in this invention include ferrous sulfide, iron carbonyls, palladium chlorides, chromium carbides, tantalum hydride, nickel permanganate, cobalt acetate, etc. The pressures employed in the practice of the present invention are at least 75,000 atmospheres, and are preferably from about 80,000 to 110,000 atmospheres, and the preferred specific pressure is about 95,000 atmospheres.

I have found that the proportions of the various ingredients employed in the practice of this invention are not critical so that the ratio of the non-diamond carbon to the catalyst material may be varied within an extremely wide range. No limitations on this range have been discovered. However, it is preferable to have more present, by volume, of the non-diamond carbon than of the catalyst material.

The process of the present invention may be carried out in any type of apparatus capable of producing the pressures required at the temperatures required. However, I prefer to employ apparatus of the type described in my copending application, Serial No. 488,050, filed February 14, 1955, and assigned to the same assignee as the present invention. The disclosure of this application is hereby incorporated by reference into the present application. The apparatus disclosed in the aforementioned application is a high pressure device for insertion between the platens of a hydraulic press. The high pressure device consists of an annular member defining a substantially cylindrical reaction zone, and two conical piston-type members designed to fit into the substantially cylindrical portion of the annular member from either side of said annular member. A specimen holder containing the reaction mixture which fits into the annular member may be compressed by the two piston members to obtain the pressures required in the practice of the present invention.

The apparatus of my aforementioned copending application Serial No. 488,050, is best described by reference to Figs. 2–4. In Fig. 2 of the drawing, a hydraulic press comprises a base 10 with a press bed 11 on which are mounted a plurality of vertical shafts 12 to support a carriage 13 with a hydraulic shaft 14. A pair of opposed recessed pistons 15 and 16 on bed 11 and carriage 13 are recessed to partially position members 17 therein, each of which is provided with an electrical connection in the form of an annular conducting ring 18 with a connector 19 to supply electric current from the source of power (not shown) through member 17 to the high pressure high temperature reaction vessel which is described below. A layer of electrical insulation 20 is provided between at least one member 17 and its associated piston 15 to prevent conduction of electrical current through the press. A pressure resisting member or belt 21 is positioned between opposed members 17 to provide a multi-staging pressure effect.

As is best shown in Fig. 3, each member 17 comprises a die 22 with surrounding binding rings 23 and 24. If desired, a soft steel safety ring 25 is located around binding ring 24. Conducting ring 18 is mounted around the periphery of safety ring 25 to conduct current through rings 25, 24 and 23 to die 22. Pressure resisting member 21, which is positioned between opposed members 17, tapers inwardly towards its center to provide an aperture 26 in axial alignment with opposed dies 22. Such a tapering effect produces greater strength in member 21 to resist pressure. Member 21 comprises an inner ring 27 surrounded by one or more binding rings 28, 29 and a soft steel safety ring 30.

As is best shown in Figs. 3 and 4, a specimen holder 31, which is positioned in aperture 26 between dies 22, comprises a pair of spaced conductive disks 32 with a hollow conductive cylinder or reaction vessel 33 therebetween. Reaction vessel 33 is adapted to contain a specimen 34 which, together with vessel 33, is to be subjected to high temperature high pressure conditions. A washer 35 of electrically insulating materials positioned around cylinder 33 between disks 32 to complete the assembly of specimen holder 31. If desired, specimen holder 31 may be in the form of a hollow casing which is in electrical contact with dies 22 but which is thermally insulated from inner ring 27.

A washer 36 is positioned between each die 22 and its associate disk 32 to provide a heat insulating core 37 with a surrounding outer conductive rim 38 in electrical contact with the die. A laminated conical gasket assembly 39 surrounds each die 22 and comprises a pair of thermally and electrically insulating and pressure resisting conical washers 40 with a metallic washer 41 between adjacent washers 40. The outer pressure resisting washer 40 is tapered inwardly to be engaged on its exterior surface by the tapered surface of inner ring 27 of member 21 and on its interior surface by washer 35 of the specimen holder 31. While only a pair of washers 40 with a single separating washer 41 are illustrated in the drawing, it has been found that a plurality of alternate washers further increases the size of specimen holder 31, the permissible motion between dies 22, and the pressure. Relatively high pressures are obtained when inner washer 40 and metallic washer 41 are eliminated and specimen holder 31 is shortened this corresponding thickness along the center line. However, pressures of the order of 40,000 to more than 100,000 atmospheres are produced when gasket assembly 39 is employed through additional increases in both relative motion and compression. Examples of suitable materials from which core 37 and washers 35 and 40 may be made are pyrophyllite and catlinite.

In the operation of the high temperature high pressure apparatus shown in Figs. 2–4, each member 17 with associated conducting ring 18 and connector 19 is positioned partially within the recesses of its associated piston in the press. Specimen 34, which is to be subjected to a high temperature high pressure environment, is placed in reaction vessel 33 within washer 35 between disks 32 to complete the specimen holder 31. Pressure resisting member 21 is positioned between opposing member 17 to locate specimen holder 31 in aperture 26 between dies 22.

Pressure is applied to specimen 34 by shaft 14 of the press. At the same time, electrical current is supplied from one electrical connector, such as upper connector 19, to upper conducting ring 18, rings 25, 24 and 23, die 22, rim 38, and disk 32, to generate heat in cylinder 33 of specimen holder 31. The current path continues from cylinder 33 through lower disk 32, rim 38, die 22, rings 23, 24 and 25, conducting ring 18, and connector 19 to the electrical source. Pressures in excess of 95,000 atmospheres at temperatures higher than 2000° C. have been maintained in such apparatus for periods of hours.

The reaction vessel or cylinder 33 described in my copending application may be formed of any of the conventional materials of construction or of graphite. Where the reaction vessel is constructed of a metal, it is convenient to employ one of the metals which act as a catalyst in the process of the present invention. This vessel may be filled with non-diamond carbon and compressed so that the metal present in the vessel will serve as a catalyst for the transformation to diamonds. Where the reaction chamber or vessel 33 is formed of graphite, it may be filled with catalyst material in either powdered or solid form and the compression of the graphite vessel provides the pressures required by the present invention. Regardless of the material of construction of the reaction vessel, the non-diamond carbon and the catalyst may be admixed inside the vessel. Thus, mixtures of powdered graphite and metal or metal compounds may be employed as a charge in the reaction vessel and the reaction vessel may be compressed to the required pressure.

In the preferred embodiment of my invention I employ a reaction vessel comprising a cylinder 33 of graphite having a hollowed out cylindrical center portion, the axis of the center portion being coaxial with the axis of the reaction vessel. Into this reaction vessel is placed a powdered mixture of graphite and the catalyst employed or alternatively, the reaction vessel may be filled by a rod of catalyst material. The reaction vessel is then sealed at its ends by metallic disks which may or may not act as a catalyst for the reaction depending on their composition. If desired, plugs of non-diamond carbon or metal may be placed in the ends of the reaction vessel before sealing. This sealed reaction vessel is then placed in the apparatus described in the aforementioned copending application and subjected to a pressure of at least 75,000 atmospheres.

Alternatively, instead of employing a reaction vessel, a cylinder of carbonaceous material such as graphite may be sandwiched between two disks formed of a metal which acts as a catalyst for the transformation and the sandwich is placed in the pressure apparatus and subjected to a pressure of at least 75,000 atmospheres. As a further alternative, a metallic reaction vessel may be sealed with a carbonaceous material in powder or solid form and the catalyst for the reaction may be supplied by mixing it with the powdered carbon or by forming end disks to seal the reaction vessel and subjecting this assembly to the required pressure. A reaction "vessel" may also be formed by compressing a mixture of non-diamond carbon and a catalyst material until a cylinder is formed which fits into the substantially cylindrical aperture described in my copending application.

In practicing the process of the present invention, heat may be applied to the reaction mixture by any suitable means. For example, satisfactory heating is obtained by galvanic conduction through the reaction mixture. This is accomplished by placing electrical leads on each side of and in contact with the reaction mixture and applying an alternating or direct potential across the reaction mixture. By such means, sufficient heat may be applied to the reaction mixture to cause the conversion from non-diamond carbon to diamond in times which are as low as one-half to 3 or 4 minutes. Another satisfactory method of applying heat to the reaction mixture is by locating heating coils adjacent this mixture. By passing electrical current through the heating coils, heat is conducted to the reaction mixture to bring it to a suitable temperature for the conversion. A still further method of heating the reaction mixture is by electrical induction heating. And a still further method of bringing the reaction mixture to a desired temperature is by the application of a flame to the reaction mixture or to the material surrounding the reaction mixture. This flame may be of any type, such as the flame obtained from a Bunsen burner or a blow torch. However, the preferred method of heating the reaction mixture is by galvanic conduction of current through the reaction mixture.

The electrical resistance of the reaction mixture may be measured by any of the conventional methods. Thus, a very satisfactory method of measuring this resistance is by means of a Wheatstone bridge. In diamond preparations where the heat is supplied to the reaction mixture by passing electrical current through this mixture, the resistance of the reaction mixture may be calculated from measurements of the potential applied across the reaction mixture and the current through the reaction mixture. The current and potential may be determined by conventional voltmeters and ammeters.

The following examples are illustrative of the practice of this invention and are not intended for purposes of limitation. In all of these examples the reaction mixture consisted of a cylindrical graphite member having a cylindrical aperture therethrough, the axis of the aperture being coaxial with that of the cylinder. The walls of the cylindrical graphite member were approximately ⅛ as thick as its diameter and the length of the cylinder was approximately 3.5 times its outside diameter. In all of the examples the cylindrical aperture in the graphite member was filled with a suitable material and the two ends of the graphite member were sealed with disk-like members whose diameters were about three times the outside diameter of the graphite cylinder, the thickness of each disk being approximately 1/10 its diameter. In all of the examples the reaction mixture was subjected to extremes of pressure and temperature by means of the apparatus disclosed in my aforementioned copending application.

In all of the examples, the diamonds formed were examined by at least one of the following methods to make sure that the product formed was actually diamond: X-ray crystallography, refractive index, density, chemical analysis, and hardness tests.

*Example 1*

A nickel rod having an outside diameter equal to the internal diameter of the graphite cylinder and having a length equal to the length of the graphite cylinder was placed inside the cylinder. This reaction mixture was then sealed at each end with a tantalum disk and electrical leads were connected to each of the disks. This mixture was then compressed to a pressure of about 95,000 atmospheres and a potential was then applied across the cylinder through the previously mentioned electrical leads. The resistance of the mixture and the power input to the mixture were observed and plotted against time as shown in curves A and B in Fig. 1. As is seen from the curve A the initial resistance of the reaction mixture was about 0.004 ohm and dropped to a value of about 0.0023 ohm in about 3 minutes. An inflection in the resistance occurred at about this time as resistance began to increase with time indicating that the nickel catalyst had melted and that the conversion of the graphite to diamond was taking place. As is shown by curve B the initial power applied to the mixture was about 200 watts. The power was increased to about 550 watts at the end of four minutes, after which time the power was allowed to decrease at the rate of about 10 watts per minute. This procedure resulted in the formation of a plurality of diamonds.

*Example 2*

The procedure employed in this example to form diamonds from graphite is the same as that of the previous examples except that the tantalum end disks were replaced by nickel end disks. The power input to the reaction vessel was initially about 500 watts and was then increased to about 600 to 700 watts over a six minute period. The resistance-time characteristics of this run are shown in curve C of Fig. 1. This curve shows an inflection in electrical resistance at five and one-half minutes indicating that diamond formation had begun at this time.

*Example 3*

In this example the procedure of Example 1 was followed except that an iron rod was substituted for the nickel rod. During this run the initial power input to the reaction cylinder was about 100 watts and increased at a steady rate to about 600 watts over a period of about five minutes, at which time the power was kept at this latter value. The resistance observed in this run is shown in curve D of Fig. 1, where an inflection is seen at about two and one-half minutes. This indicates that diamonds were formed at about two and one-half minutes after the run was started.

*Example 4*

Following the procedure of Example 1, a plurality of diamonds were formed from a cylindrical graphite member filled with powdered FeS with the ends of the graphite members sealed with tantalum disks. The initial power applied to this reaction mixture was about 200 watts and increased at a steady rate to a value of about 600 watts over a period of about six minutes. The power was then maintained at this latter value. The resistance observed in this run appears as curve E in Fig. 1, with an inflection at about five minutes, indicating that the ferrous sulfide had decomposed into iron and sulfur and the iron had melted to begin the conversion.

*Example 5*

A number of diamonds were formed following the procedure of Example 1 and using the same reactants except that the nickel rod of that example was replaced with a mixture of about equal parts by volume of powdered iron and tantalum carbide. The initial power applied to the reaction mixture was about 200 watts and increased at a steady rate to about 600 watts over a five minute period at which time the power was maintained at the latter level. The resistance observed is shown as curve F in Fig. 1 with an inflection in the electrical resistance appearing after about six minutes.

*Example 6*

The procedure of Example 1 was followed again and the same reactants as used in that example were employed except that the nickel rod was replaced with a mixture of equal parts by volume of powdered iron and powdered tantalum. The power input characteristics observed in this run were substantially the same as those observed in Example 5 and the resistance characteristics are shown in curve G in Fig. 1 where an inflection is noted at about three and one-half minutes. At this time the iron and tantalum had begun to melt indicating that the conversion to diamond had started.

Although the foregoing examples describe the present invention only in connection with reaction mixtures comprising filled cylindrical graphite tubes, it should be understood that the geometry of the reaction mixture is not critical and that shapes other than cylindrical may be used effectively. The resistance-time effect will be found with these other geometrical shapes. While the examples describe preparations using only a pressure of about 95,000 atmospheres, other pressures within the range described are also effective in the conversion of non-diamond carbon to diamond by the method of the present invention.

My discovery of the inflection in the electrical resistance of the reaction mixture when heat is applied to said mixture enables an accurate determination of when the non-diamond carbon has been converted to diamond and indicates the time at which the application of heat and pressure may be terminated. In addition, the inflection property discovered may obviously be made the basis of an automatic method of making diamonds. Thus, after a reaction mixture has been placed in apparatus capable of producing the pressures and temperatures required, automatic means can be used to start the apparatus. Other automatic means responsive to a marked change in the rate of change of electrical resistance of the reaction mixture may be used to terminate the operation of the apparatus at any desired time after an inflection in the electrical resistance of the mixture has occurred.

Since diamonds prepared by the method of this invention are indistinguishable from natural diamonds, they have the same utility as natural diamonds, e.g., as gems for use in jewelry and other ornamental articles, as the cutting edge of a glass cutter, as the abrasive ingredient in abrasive wheel formulations, etc.

What I claim as new and desire to secure by Letters Patent of the United States is:

1. In the process for making diamonds by heating non-diamond carbon at elevated temperatures and pressures in the presence of a metallic catalyst for the conversion of the non-diamond carbon to diamond, the improvement which comprises measuring the electrical resistance of the aforesaid combination of non-diamond carbon and catalyst, applying sufficient heat to said mixture for a time sufficient to cause an inflection in the electrical resistance of said mixture thereby indicating melting of the catalyst and incipient diamond formation, and thereafter reducing the pressure and temperature in response to said inflection.

2. The method of claim 1 in which the catalyst is iron.

3. The method of claim 1 in which the catalyst is tantalum.

4. The method of claim 1 in which the catalyst is nickel.

5. In the process for making diamonds by heating non-diamond carbon at an elevated temperature and at a pressure of at least about 75,000 atmospheres in the presence of a metallic catalyst for the conversion of non-diamond carbon to diamond selected from the class consisting of iron, nickel and tantalum, the improvement which comprises measuring the electrical resistance of the aforesaid combination of non-diamond carbon and catalyst, applying sufficient heat to said mixture for a time sufficient to cause an inflection in the electrical resistance of said mixture thereby indicating melting of the catalyst and incipient diamond formation, and thereafter reducing the pressure and temperature in response to said inflection.

6. The method of claim 5 in which the non-diamond carbon is graphite.

7. The method of claim 6 in which the catalyst is nickel.

8. The method of claim 6 in which the catalyst is iron.

9. The method of claim 6 in which the catalyts is tantalum.

10. The method of making diamond which comprises positioning a nickel rod in a graphite cylinder to form an assembly, subjecting said assembly to a pressure of about 95,000 atmospheres, measuring continuously the electrical resistance of said assembly, applying sufficient heat to said assembly for sufficient time to cause an inflection in the electrical resistance of said assembly, thereafter reducing the pressure and terminating the application of heat in response to said inflection, and recovering the diamond so formed.

References Cited in the file of this patent

FOREIGN PATENTS 377,239    Great Britain _____ July 21, 1932

OTHER REFERENCES

Gunther et al.: "Z. anorg. allgem. Chem.," vol. 250, pp. 357–372 (1943).

Bridgman: "Jour. of Chem. Physics," vol. 15, pages 92–98 (1947).

Perry: "Chemical Engineers Handbook," 3rd edition, page 1269 (1950), McGraw-Hill Publ. Co., N.Y.

The Washington, D.C., Evening Star, page A-3, Feb. 15, 1955.

(Other references on following page)

OTHER REFERENCES

Neuhaus: "Angewandte Chemie," vol. 66, pp. 525–536, Sept. 7, 1954.

Kuss: "Chemie Ingenieur Technik," vol. 28, No. 3, pp. 141–152, March 1956.

Liander: "ASEA Journal," vol. 28, pp. 97, 98, May, June 1955.

Bridgman: "Am. Academy of Arts and Sciences," vol. 81, No. 4, pp. 169–184, 224, 236, 237, 242–244, March 1952.

Bridgman: "Reviews of Modern Physics," vol. 18, pp. 1–10, 27–37, 62–68, 79–88 (1946).

D. P. Mellor: "Research," vol. 2, No. 7, p. 315, July 1949.